3,113,420
5,5-DIMETHYL-4,6-METHANOSPIRO[2.5]OCTANE AS A NEW COMPOUND AND USE AS A HIGH ENERGY FUEL
Robert J. Wineman, Concord, Mass., assignor, by mesne assignments, to Monsanto Research Corporation, Everett, Mass., a corporation of Delaware
No Drawing. Filed Sept. 21, 1960, Ser. No. 57,399
6 Claims. (Cl. 60—35.4)

This invention relates to tricyclic monospirane hydrocarbons. In one aspect, this invention relates to 5,5-dimethyl-4,6-methanospiro[2.5]octane as a new compound. In another aspect, this invention relates to methods for preparing 5,5-dimethyl-4,6-methanospiro[2.5]octane. In another aspect, this invention relates to high energy fuel compositions for use in reaction type power plants. In another aspect, this invention relates to improved methods of developing thrust. In another aspect, this invention relates to methods of operating reaction type power plants, such as jet propulsion type engines, including rocket, ramjet, pulse-jet, and turbo-jet engines, and turbine type engines, including turbo-prop and gas turbine engines.

The development of reaction type power plants has been accompanied by the requirement for developing fuels suitable for use in such engines. In a reaction type power plant, fuel and an oxidizing agent are admixed under suitable conditions and in suitable proportions whereby the fuel is oxidized or burned in a pressure-restraining combustion chamber to form a mass of high temperature gases which comprise the fuel combustion products and any excess oxidizing agent. The high temperature gases are exhausted from the combustion chamber at high velocity to produce thrust in accordance with the law of momentum. In a jet propulsion type engine, such as a rocket, ram-jet, turbo-jet, or pulse-jet engine, exhaustion of the high temperature gases is directed in a rearward direction to produce a true jet propulsion. In a turbine type engine, such as a gas turbine or a turbo-prop engine, the exhaustion of the high temperature gases is directed into a turbine which drives a propeller or other mechanical means for developing a forward thrust. Reaction type power plants may be used in widely different types of vehicles such as in space ships, aircraft, boats, guided missiles, automobiles, and the like.

Heretofore, it was believed that many hydrocarbons did not vary sufficiently in their burning characteristics to make a material difference in the operation of reaction type power plants. Although these power plants may be operated under many conditions with substantially any fuel, other conditions of operation encounter operational difficulties and require fuels having particular properties. One difficulty which has been encountered in power plants for high speed vehicles is that many fuels lack thermal stability, resulting in the formation of insoluble gum and other deposits which hamper performance. At high speeds, particularly supersonic speeds in aircraft, the fuel supply must serve to absorb the aerodynamic heat which builds up faster than can be dissipated to the atmosphere. A refrigeration system is not suitable in such applications because of weight and volume limitations. Under some conditions, the fuel will be heated to a temperature as high as 500° F. or higher but the presently available JP-4 fuel is thermally stable to a temperature of only about 400° F. Therefore, it is desirable to have a fuel which is thermally stable at a temperature of at least as high as 500° F.

Another serious disadvantage of the prior art fuels is the low heat of combustion of such fuels. Aircraft generally, and particularly military aircraft, are being designed for higher and higher speeds requiring higher energy level fuels. The fuel must not only have a high energy level on a weight basis, or high B.t.u./lb., but also a high energy level on a volume basis, or a high B.t.u./gal., since wing sections are being made thinner in order to reduce drag and space for storage of fuel is limited. Thus, aircraft are often volume limited as well as weight limited for the storage of fuel. Aircraft are particularly volume limited using the currently available JP-6 high energy fuel which has a heat of combustion of 18,400 B.t.u./lb. on a weight basis but a heat of combustion of only 119,500 B.t.u./gal. on a volume basis. Therefore, it is very desirable to provide a high energy fuel having a high heat of combustion on a volume basis, preferably greater than 120,000 B.t.u./gal., and at the same time obtain the other characteristics necessary for a good fuel of this type.

An object of this invention is to provide 5,5-dimethyl-4,6-methanospiro[2.5]octane as a new compound.

Another object of this invention is to provide methods for preparing 5,5-dimethyl-4,6-methanospiro[2.5]octane.

Another object of this invention is to provide high energy fuel compositions for use in reaction type power plants.

Another object of this invention is to provide improved methods of developing thrust.

Another object of this invention is to provide improved methods of operating reaction type power plants, particularly jet propulsion type engines, including rocket, ramjet, turbo-jet, and pulse-jet engines, and turbine type engines including turbo-prop and gas turbine engines.

Other aspects, objects and advantages of this invention will be apparent from a consideration of the accompanying disclosure and the appended claims.

According to the present invention, there is provided, as a new compound, 5,5-dimethyl-4,6-methanospiro[2.5]-octane.

Also, according to the present invention, there are provided methods for producing 5,5-dimethyl-4,6-methanospiro[2.5]octane by carbenating β-pinene, preferably with methylene iodide in the presence of a zinc-copper couple.

Also, according to the present invention, there are provided high energy fuel compositions comprising, as an essential ingredient, 5,5-dimethyl-4,6-methanospiro[2.5]-octane.

Also, according to the present invention, there are provided improved methods of developing thrust, said methods comprising oxidizing a high energy fuel composition comprising, as an essential ingredient, 5,5-dimethyl-4,6-methanospiro[2.5]octane with an oxidizing agent in a reaction chamber to produce a mass of high temperature gases and exhausting said gases from said reaction chamber in a manner so as to develop a large amount of thrust.

Also, according to the present invention, there are provided improved methods of operating reaction type power plants, said methods comprising injecting a stream of an oxidizing agent and a stream of a fuel composition comprising, as an essential ingredient, 5,5-dimethyl-4,6-methanospiro[2.5]octane into the combustion chamber of said reaction type power plant in such proportion as to produce a combustible mixture, subjecting said combustible mixture to combustion, and exhausting the resulting gases from the said combustion chamber so as to impart thrust thereto.

The 5,5-dimethyl-4,6-methanospiro[2.5]octane of the present invention can be illustrated by the following structural formula:

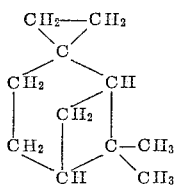

This hydrocarbon is produced by reacting β-pinene having the formula:

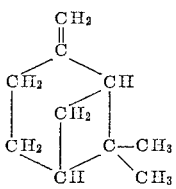

with a carbene, i.e., a divalent carbon intermediate, which is preferably generated from methylene iodide and a zinc-copper couple. For general reactions of the carbenes, see, e.g., the papers by W. von E. Doering et al., J. Amer. Chem. Soc. 76, 6162 (1954), and W. Kirmse, Angew Chem. 71, 537 (1959).

The zinc-copper couple is prepared for the reaction by heating a mixture containing from 75% to 95% zinc and, correspondingly, from 25% to 5% copper in a hydrogen atmosphere at a temperature in the range of from 425° C. to 475° C. for a period of from 4 to 6 hours. In the formation of the zinc-copper couple, the first part of the reaction is highly exothermic and care must be taken to avoid heating the mixture much above the temperature of 475° C. Preparation of the carbene is carried out in an inert solvent medium, such as, for example, anhydrous diethyl ether, ethyl acetate, ethylene glycol, dimethyl ether, tetrahydrofuran, and the like. Diethyl ether and tetrahydrofuran are preferred. The reaction is conveniently started in the presence of a small amount of iodine; however, the reaction can be conducted without the presence of this activation iodine. The reaction is initially conducted at substantially room temperature and is continued at reflux temperature for a period of from 24 to 60 hours. This reaction is preferably carried out at atmospheric pressure although subatmospheric and superatmospheric pressures can also be used.

The advantages, desirability, and usefulness of this invention are illustrated by the following examples.

EXAMPLE 1

A zinc-copper couple was prepared from a mixture of 120 g. of zinc dust and 15 g. of cupric oxide. This admixture was placed in an 8-inch Vycor boat in a ceramic combustion tube and heated in a stream of hydrogen to a temperature of 450° C. over a period of from about 90 to 100 minutes. The temperature of the mixture was carefully determined using three iron-constantan thermocouples inserted into the reaction mixture. The reaction was found to be exothermic and required very careful heating in order to prevent the temperature from going above 475° C. The contents of the Vycor boat were held at a temperature of 425° C. to 450° C. for an additional period of approximately 4 hours in the hydrogen atmosphere. At the end of this time, the mixture was permitted to cool in the hydrogen atmosphere to obtain the zinc-copper couple as a grayish powder.

Reaction with the zinc-copper couple was conducted in a 1000 ml. flask into which was placed 69.3 g. (0.83 g.-atom of zinc) of the zinc-copper couple, 293.4 ml. of anhydrous diethyl ether which had been dried over sodium, and 12.7 g. (0.05 mole) of iodine crystals. Upon the addition of the iodine crystals, a brief exothermic reaction occurred and after this reaction had subsided with the disappearance of the iodine color, 222.4 g. (0.83 mole) of redistilled methylene iodide and 151 g. of redistilled β-pinene were added together. The resulting mixture was then refluxed for a period of 48 hours. At the end of this time, the reaction mixture was treated with a low-boiling olefin and more zinc-copper couple in order to destroy the excess methylene iodide. The additional zinc-copper couple, in an amount of 30.15 g. (0.45 g.-atom of zinc) was added to the mixture followed by 6.2 g. (0.024 mole) of iodine. After the initial reaction resulting from the addition of the iodine had subsided, 31.5 g. (0.45 mole) of 2-methylbutene-2 was added as the olefin and the reaction mixture refluxed for an additional 22 hours. At the end of this time, the mixture was cooled and centrifuged to remove the finely divided metals. The centrifugate obtained was extracted three times with cold 5% hydrochloric acid, three times with 5% sodium bicarbonate solution, and two times with water. The organic phase obtained was allowed to stand overnight over anhydrous calcium chloride and was then evaporated by a rotary evaporator to remove the solvent. In this evaporation, the pressure was lowered to 27 mm. and the flask was cooled by immersion in ice water. The crude product thus obtained amounted to 153.0 g. This product was purified by first subjecting it to vacuum distillation in a 30 cm. helix packed column to obtain a fraction boiling at 25° C./4.5 mm. to 31° C./5 mm. Hg pressure in an amount of 50.9 g. This fraction was then distilled a second time through the same column to obtain 42.0 g. of the 5,5-dimethyl-4,6-methanospiro[2.5]-octane boiling at 36.5° C./7 mm. to 38.5° C./6 mm. This product was further purified by passage through 10 cm. of 100–200 mesh silica gel to obtain 35.4 g. of the purified product. The product analyzed 88.0% carbon and 12.0% hydrogen as compared with calculated values of 88.0% carbon and 11.9% hydrogen. The proposed structure for the compound was confirmed by inspection of the infra-red spectrum of the product.

EXAMPLE 2

In this example, 5,5-dimethyl-4,6-methanospiro[2.5]-octane was subjected to inspection tests in order to show from the thermal and physical properties that this compound is suitable for use in the operation of reaction type power plants. The results of these tests are given in Table I.

Table I

THERMAL AND PHYSICAL PROPERTIES OF 5,5-DIMETHYL-4,6-METHANOSPIRO[2.5]OCTANE FUEL

| | |
|---|---|
| Hydrogen/carbon ratio | 0.136. |
| Luminometer number | 22.05. |
| Index of refraction, $n_D^{20}$ | 1.4762. |
| Boiling point, ° C. | 26.5° C./7 mm. to 38.5° C./6 mm. |
| Density at 99° C., g./ml | 0.8269. |
| Heat of combustion, B.t.u./lb., net | 18,573. |
| Heat of combustion, B.t.u./gal., net | 137,959. |
| Viscosity, cs., at: | |
| 0° C. | 5.29. |
| 38° C. | 2.29. |
| 99° C. | 1.00. |
| 166° C. | 0.78. |
| Thermal decomposition temp., ° F. | 672. |
| Freezing point, ° F. | −92.0. |

Heats of combustion were obtained with a Parr oxygen bomb calorimeter on both a weight and a volume basis following the ASTM D-240-57T procedure. The freezing point was determined using the ASTM D-1477-57T procedure. Density was determined at a temperature of 99° C. using a Lipkin bicapillary pycnometer. Viscosities at various temperatures were measured using the standard Cannon-Fenske capillary viscosimeter following the ASTM D-445 procedure.

The luminometer number was obtained using a luminometer manufactured by the Erdco Engineering Corp. The procedure for determining luminometer numbers involved burning the fuel in a luminosity lamp and measuring the temperature rise above the lamp for varoius luminosity readings. From a graph of luminosity readings versus lamp temperature rise, the temperature rise for a luminosity reading of 45 was obtained. The same procedure was repeated to obtain temperature rise values at a luminosity reading of 45 for isooctane and tetralin which serve as reference points of 100 and 0, respectively. The luminometer number was then obtained by dividing the difference between the temperature rise of the test fuel and the temperature rise of the tetralin by the difference in the temperature rise of isooctane and the temperature rise of tetralin multiplied by 100.

The thermal decomposition temperature was obtained using a high temperature, high pressure isoteniscope which consist of a Monel bomb capped at one end and connected to a precision pressure gauge by a Monel diaphragm. The test fuel was heated within the bomb to an elevated temperature under high pressure and the temperature measured at which the fuel began to decompose and evolve gas as determined by the changes of pressure within the bomb. In this method, the formation of deposits in the decomposition reaction is not measured because some fuels may start to decompose to gas before forming deposits.

The above examples indicate that 5,5-dimethyl-4,6-methanospiro[2.5]octane is very suitable for use in various reaction type power plants. This particular compound has very high heat of combustion on both a weight basis and a volume basis and may therefore be very advantageously employed in jet propulsion type engines and turbine type engines where extremely high energy contents are desirable on either a weight basis or a volume basis. Another advantage in using this compound in a reaction type power plant fuel is the fact that this compound has a very low freezing point and, therefore, can be handled satisfactorily at low temperatures.

The 5,5-dimethyl-4,6-methanospiro[2.5]octane of this invention is also characterized by unusually high thermal stability when employed as a fuel for a reaction type power plant. This factor is of importance not only in the actual combustion taking place in the engine, but also in the fuel system prior to the burning step. For example, it is necessary in high speed aircraft to use the fuel reservoir to absorb the aerodynamic heat which builds up faster than can be dissipated to the atmosphere and thereby the fuel is heated to a temperature of 500° F. or higher. If degradation of the fuel occurs, gum and coke are deposited in the fuel system, thereby seriously hampering the smooth flow of fuel from the reservoir into the combustion zone.

In operating reaction type power plants with the new hydrocarbon fuels of this invention, the fuel and an oxidizing agent are admixed together to form a combustible mixture which is then ignited either by a spark ignition device or by the burning fuel itself. The fuel compositions of this invention are not limited to use with particular oxidizing agents and almost any oxidizing agent known to those skilled in the art can be used. Ordinarily, in most aircraft applications using turbo-prop, turbo-jet, pulse-jet and gas turbine engines, the oxidizing agent is air which is compressed either by a mechanical compressor or aerodynamically. Also, in automotive and in ship applications, the oxidizing agent will ordinarily be air.

In contrast to these applications, the oxidizing agent will usually be liquid oxygen or another chemical oxidizer, for example, fuming nitric acid, hydrogen peroxide, fluorine, or the like in guided missile and rocket applications. In some applications, a mixture of oxidizing agents will also be useful.

The fuel compositions of the present invention may be blended with other materials such as gasoline, kerosene, mixtures of gasoline and kerosene, other aviation fuels, and with the presently available jet fuels to produce an improved fuel combustion. More particularly, the fuel described herein may be added to the present aliphatic hydrocarbon fuels having a heat of combustion of about 112,000 B.t.u./gal. to raise the overall heat of combustion thereof to at least about 120,000 B.t.u./gal. Moreover, the fuels described herein may be used in combination with fuel additives to improve various characteristics of the fuel, including liquid viscosity, burning characteristics, and the like.

In the operation of reaction type power plants using the fuel compositions of this invention, the fuel and oxidizing agent are charged into the combustion chamber in a proportion which gives rise to a combustible mixture. Where the oxidizing agent is air, the fuel-air ratio will ordinarily be maintained between 0.005 and 0.15. The particular fuel-air ratio used will be dependent not only upon the power requirements at the moment but also upon the nature of the engine. Thus, turbo-jet engines are preferably operated on a fuel-air ratio of about 0.01 to 0.03 whereas ram-jet engines are usually operated at a fuel-air ratio of 0.03 to 0.07.

Reasonable variation and modification of the invention as described are possible, the essence of which is that there have been provided (1) 5,5-dimethyl-4,6-methanospiro[2.5]octane as a new compound, (2) methods for preparing said 5,5-dimethyl-4,6-methanospiro[2.5]octane, (3) high energy fuel compositions containing said 5,5-dimethyl-4,6-methanospiro[2.5]octane as an essential ingredient, (4) improved methods of developing thrust, and (5) methods of operating reaction type power plants.

I claim:

1. The method of developing thrust in a reaction chamber, said method comprising oxidizing a hydrocarbon fuel composition comprising essentially 5,5-dimethyl-4,6-methanospiro[2.5]octane in said reaction chamber to produce a mass of high temperature gases and exhausting said gases from said reaction chamber so as to develop a high thrust.

2. The method of operating a reaction type power plant, said method comprising injecting a stream of an oxidizing agent and a stream of a hydrocarbon fuel comprising essentially 5,5-dimethyl-4,6-methanospiro[2.5]octane into the combustion chamber of said reaction type power plant, oxidizing said fuel in said combustion chamber, and exhausting the resulting gases from said combustion chamber so as to impart thrust.

3. The method of operating a jet propulsion engine, said method comprising injecting a stream of an oxidizing agent and a stream of a hydrocarbon fuel comprising essentially 5,5 - dimethyl-4,6-methanospiro[2.5]octane into the combustion chamber of said jet propulsion engine, oxidizing said fuel in said combustion chamber, and exhausting the resulting gases in a rearward direction from said combustion chamber so as to impart thrust to said jet propulsion engine.

4. The method of operating a gas turbine engine, said method comprising injecting a stream of an oxidizing agent and a stream of a hydrocarbon fuel comprising essentially 5,5-dimethyl-4,6-methanospiro[2.5]octane into the combustion chamber of said gas turbine engine, oxidizing said fuel, and exhausting the resulting gases from said combustion chamber through a turbine to develop motive power.

5. The method of operating a turbo-jet engine, said method comprising injecting a stream of air and a stream of a hydrocarbon fuel comprising essentially 5,5-dimethyl-4,6-methanospiro[2.5]octane into the combustion chamber of said turbo-jet engine, burning said fuel in said combustion chamber, exhausting the resulting gases from said combustion chamber through a turbine to expand the same and compress the air supplied to said combustion chamber, and passing the gases into the atmosphere by way of a nozzle to impart thrust to said engine.

6. The method of operating a turbo-jet engine which comprises injecting a stream of air and a stream of 5,5-dimethyl-4,6-methanospiro[2.5]octane into the combustion chamber of said engine, effecting combustion in said chamber, and exhausting the resulting gases from said combustion chamber through a turbine to expand the same and compress the air supplied to said combustion chamber, and passing the gases into the atmosphere by way of a nozzle to impart thrust to said engine.

References Cited in the file of this patent

UNITED STATES PATENTS

| | | |
|---|---|---|
| 2,331,596 | Campbell | Oct. 12, 1943 |
| 2,514,546 | Ipatieff et al. | July 11, 1950 |
| 2,765,617 | Gluesenkamp et al. | Oct. 9, 1956 |
| 2,826,037 | Scott et al. | Mar. 11, 1958 |

OTHER REFERENCES

Hackh's Chemical Dictionary, 3rd ed. (1950), pages 166, 241 and 534, The Blakiston Co., Philadelphia.